United States Patent [19]
Kazami et al.

[11] Patent Number: 5,500,709
[45] Date of Patent: Mar. 19, 1996

[54] LIGHT SOURCE COLOR INFORMATION RECORDING APPARATUS

[75] Inventors: Kazuyuki Kazami, Tokyo; Norikazu Yokonuma, Yokohama; Youichi Yamazaki; Hideo Hibino, both of Kawasaki, all of Japan

[73] Assignee: Nikon Corporation, Tokyo, Japan

[21] Appl. No.: 360,448

[22] Filed: Dec. 21, 1994

[30] Foreign Application Priority Data

Dec. 22, 1993 [JP] Japan ................................. 5-324392

[51] Int. Cl.⁶ ...................... G03B 15/05; G03B 17/24
[52] U.S. Cl. ................... 354/416; 354/419; 354/430; 354/106; 354/127.1
[58] Field of Search ........................ 354/430, 105, 354/106, 419, 127.1, 127.13, 416

[56] References Cited

U.S. PATENT DOCUMENTS

| | | | |
|---|---|---|---|
| 5,016,039 | 5/1991 | Sosa et al. | 354/430 |
| 5,128,708 | 7/1992 | Murayama et al. | 354/430 |

*Primary Examiner*—W. B. Perkey
*Attorney, Agent, or Firm*—Oliff & Berridge

[57] ABSTRACT

A light source color information recording apparatus comprising a recording control device that records light source color information related to the color of the light illuminating the photographic subject detected by a light source color information detection device in a specific information recording medium for each photographic frame, and a prohibiting device that prohibits recording of light source color information that would otherwise be performed by the recording control device, for photographic frames on which flash photographing has been performed.

22 Claims, 11 Drawing Sheets

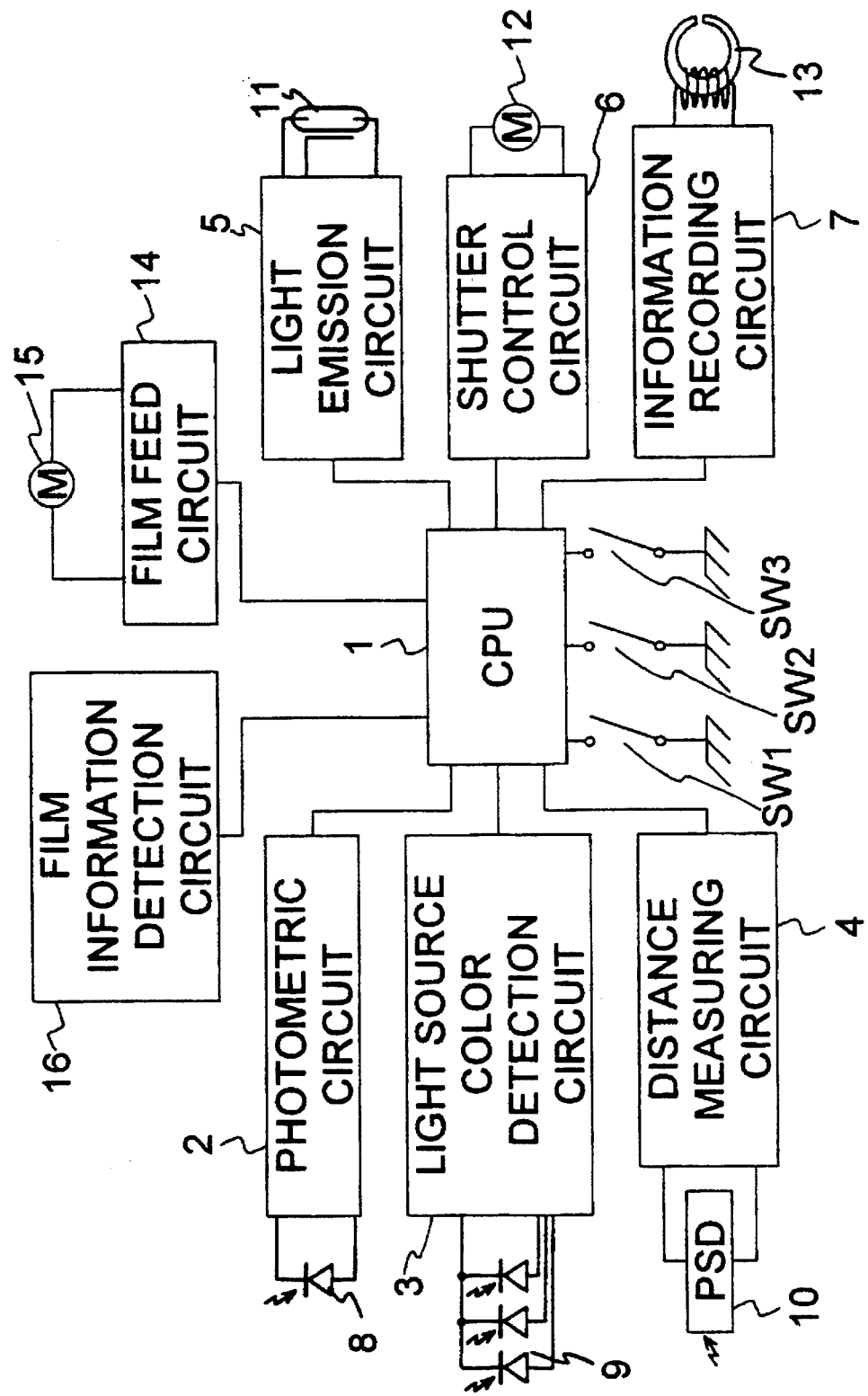

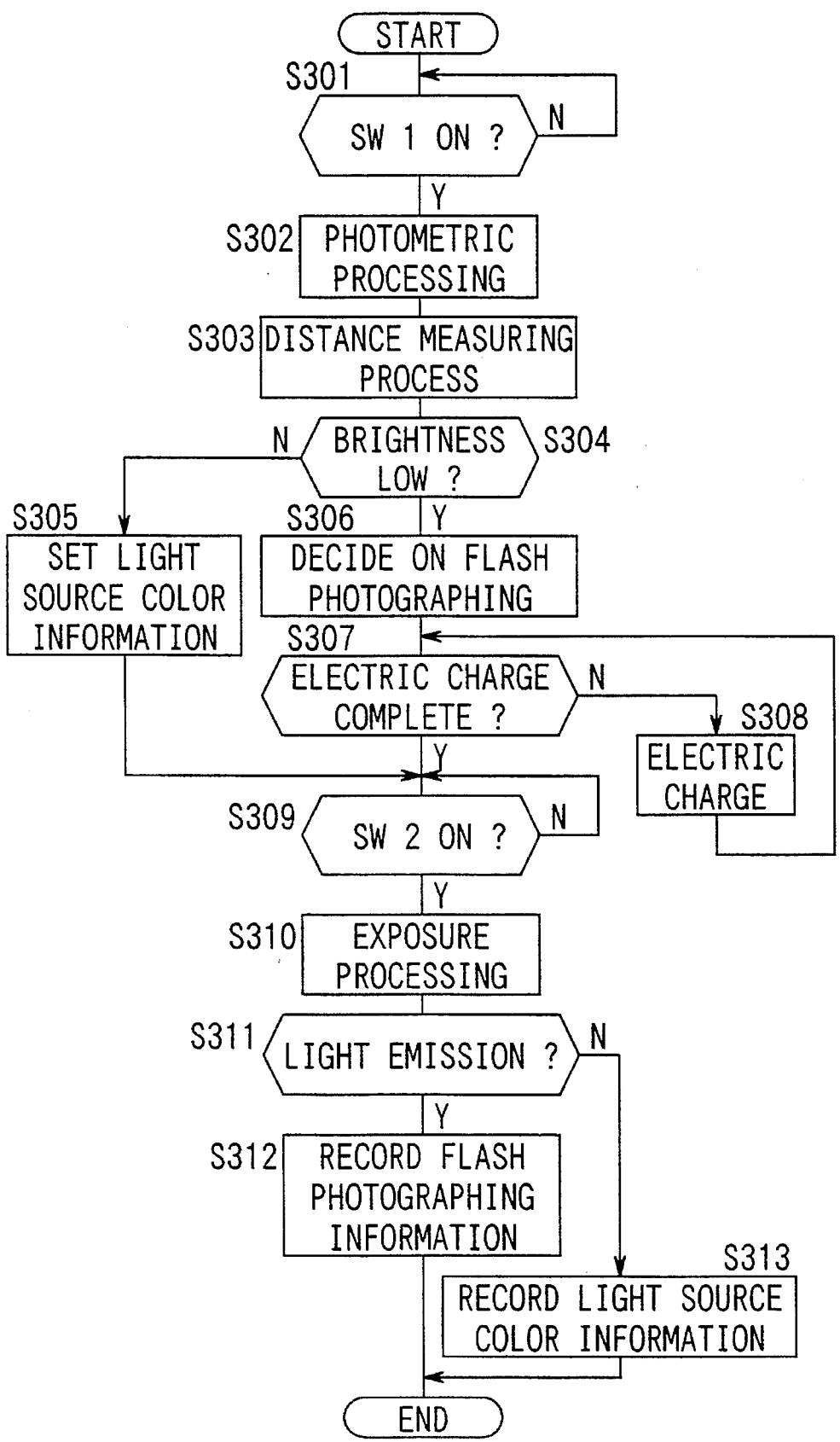

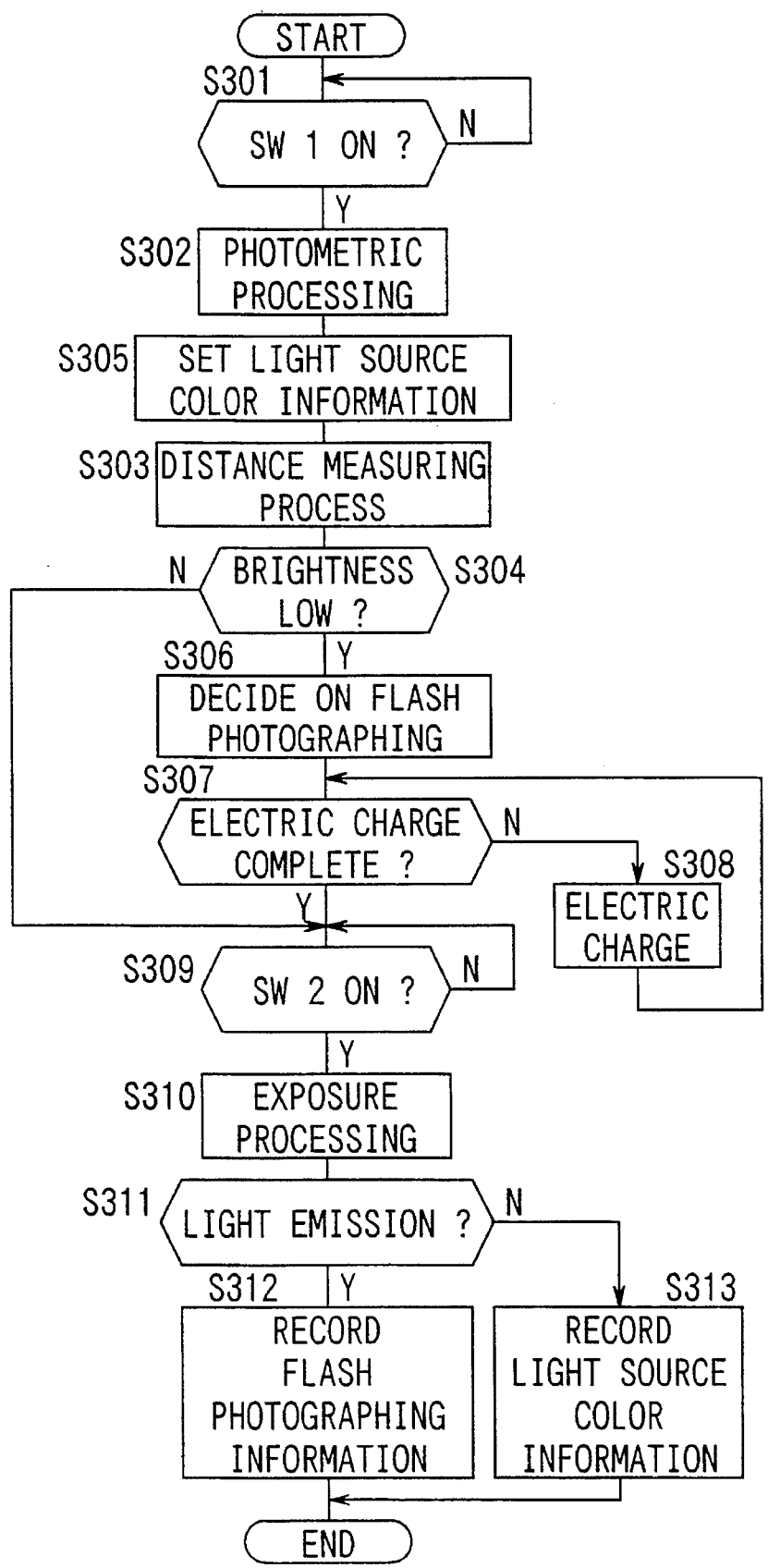

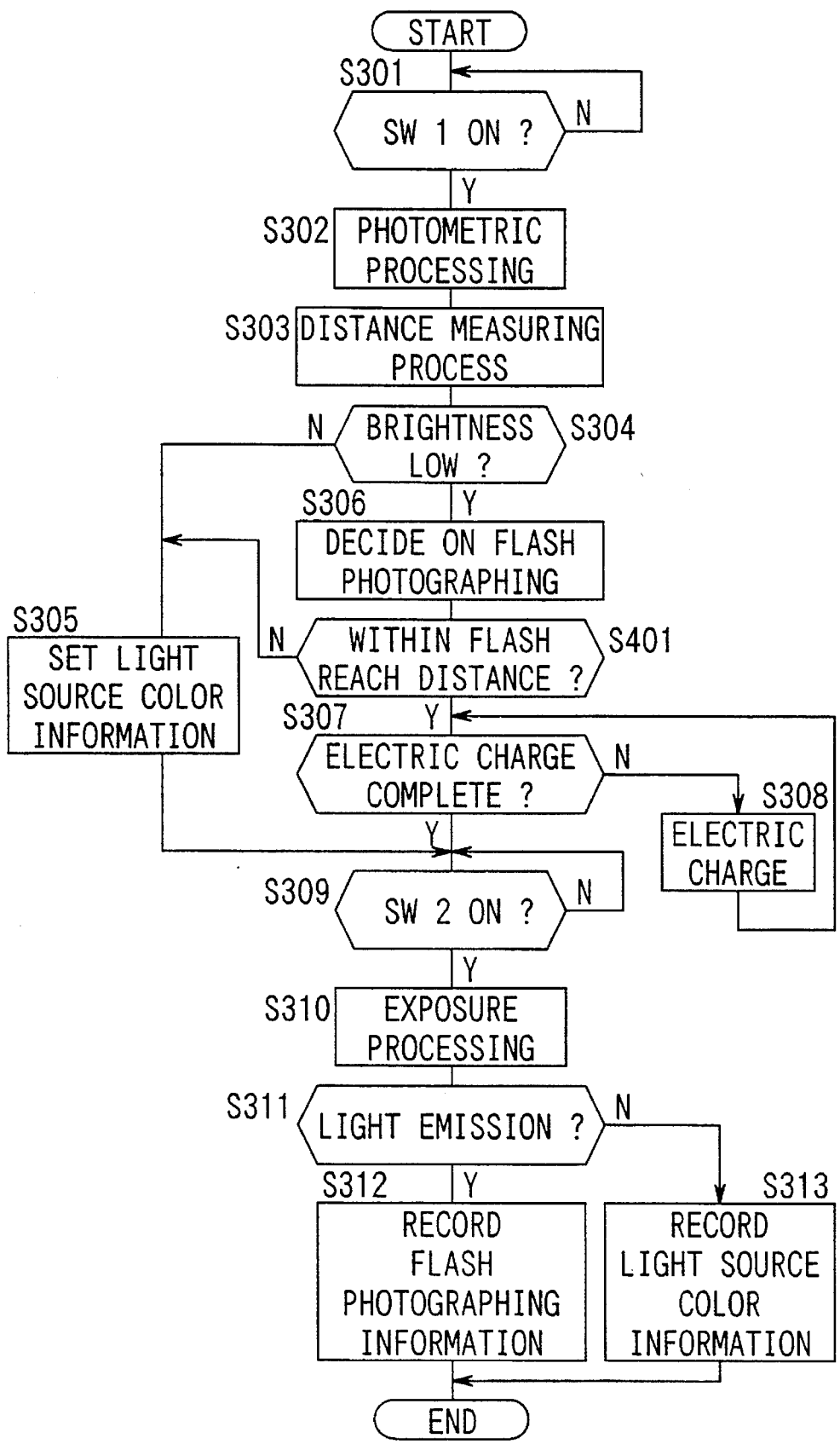

LIGHT SOURCE COLOR INFORMATION RECORDING APPARATUS

BACKGROUND OF THE INVENTION

1. Field of the Invention

The present invention relates to a light source color information recording apparatus which is capable of recording information related to the color of the light source that illuminates the photographic subject (hereafter referred to as light source color) on, for example, film.

2. Description of the Related Art

The illuminating light which illuminates a photographic subject to be photographed with a camera varies, depending upon the time and place of photographing, among, for example, sunlight, fluorescent light and light from an incandescent lamp. The light source color also varies depending upon the type of illuminating light, and the color of the photographic subject when printed changes depending upon the light source color. In the prior art, a camera which records the information related to the light source color of the light source for lighting a photographic subject (hereafter referred to as light source color information) on film is known. This camera is provided with a light source color detection device, such as a colorimetric device, which detects the light source color prior to photographing, and a recording device, such as a magnetic head, that records the light source color information based upon the detected light source color in an information recording area in each photographic frame of the film. The recorded light source color information is read by the printing device at the print service facility and, based upon this information, color correction is performed at the time of printing. With this, prints with accurate color are achieved regardless of the type of light source being used to light the photographic subject.

Also known in the prior art is a camera that records flash photographing information on the film when flash photographing is performed using an electronic flash device.

When performing flash photographing, since the illuminating light from the electronic flash device on the photographic subject is dominant, the light source color information detected prior to photographing is not significant. However, because this point is not considered with the light source color information recording apparatus in the prior art, light source color information that is meaningless for the photographic frames on which flash photographing has been performed will, nevertheless, be recorded. In such a case, color correction performed at the time of printing is likely to be erroneous and this will result in photos with undesirable color. In particular, when a light source color recording function is added to a camera that is capable of recording the flash photographing information described above, there arises a problem of determining which information should be recorded in flash photographing.

SUMMARY OF THE INVENTION

The object of the present invention is to provide a light source color information recording apparatus with which it is possible to obtain photos with accurate color at all times, regardless of whether or not there is light emission by an electronic flash device.

In order to achieve the object described above, the light source color information recording apparatus according to the present invention is provided with a recording control device that records light source color information related to the color of the light illuminating the photographic subject, detected by a light source color information detection device, in a specific information recording medium for each photographic frame, and a prohibiting device that prohibits recording of light source color information performed by the recording control device, for photographic frames on which photographing using a flash device has been performed.

When flash photographing has been performed, recording of the light source color information for the relevant photographic fames is prohibited. As a result, when printing those photographic frames on which flash photographing has been performed, no color correction is performed based upon the light source color information, thus preventing prints with undesirable colors.

BRIEF DESCRIPTION OF THE DRAWINGS

FIG. 1A is a block diagram of the control system of the light source color information recording apparatus in a camera in an embodiment according to the present invention;

FIG. 2 is a flow chart that explains the operation in the embodiment above;

FIG. 3 is a flow chart that explains the operation in another embodiment;

FIG. 4 is a flow chart that explains the operation in yet another embodiment;

DETAILED DESCRIPTION OF THE PREFERRED EMBODIMENTS

Figure 1B:
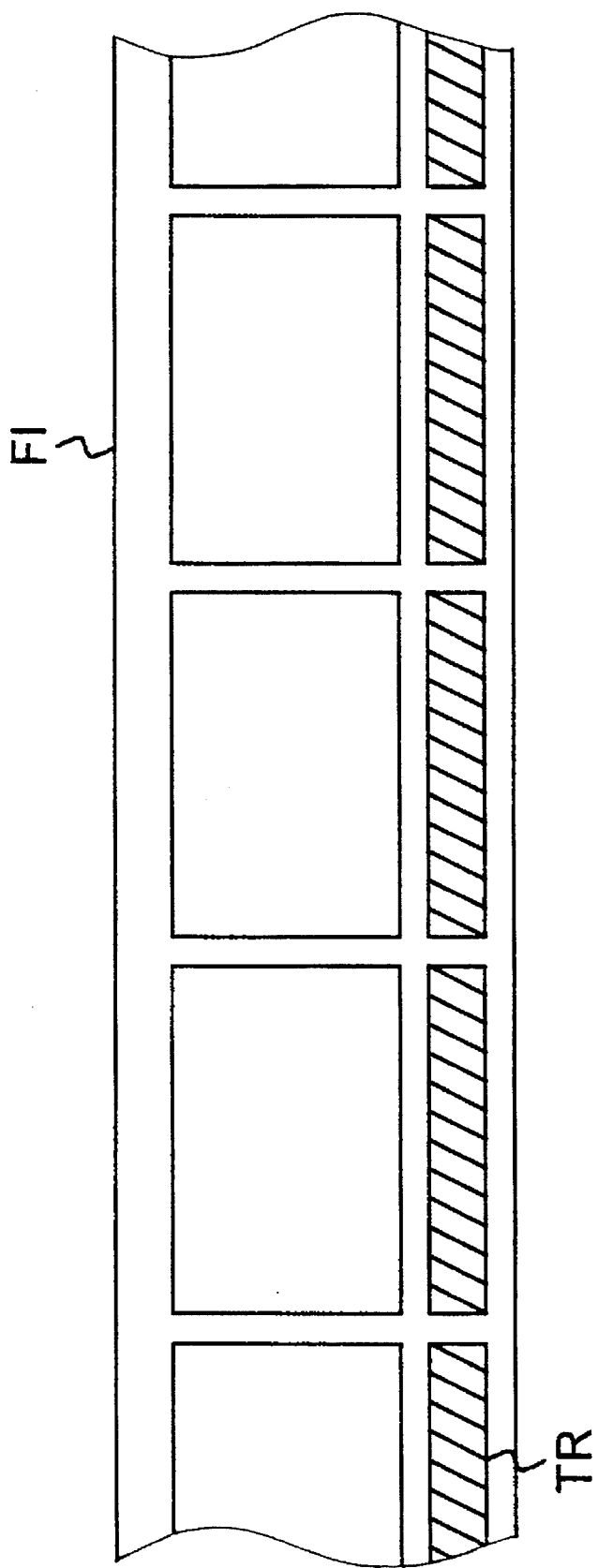
FIG. 1B shows the film used in the embodiment above.

An embodiment according to the present invention is explained in reference to FIGS. 1A, 1B and 2.

FIG. 1A is a block diagram of the control system of a camera that is capable of recording light source color information according to the present invention. A photometric circuit 2, a light source color detection circuit 3, a distance measuring circuit 4, a light emission circuit 5 for an electronic flash device, a shutter control circuit 6, an information recording circuit 7, a film feed circuit 14 and a sensitivity detection circuit 16 are connected to the CPU 1. The photometric circuit 2 detects the brightness of the photographic subject by using a photo sensitive element 8 for photometry and inputs the detected brightness of the photographic subject to the CPU 1.

The light source color detection circuit 3 such as sensors for white balance adjustment used in video cameras, is provided with a plurality of photo sensitive elements 9, which receive the light from the photographic subject over part of, or the entirety of the photographic field and perform photoelectric conversion. The detection circuit 3 detects the three primary color constituents (RGB) of the photographic subject light based upon the photoelectric conversion outputs from the various photo sensitive elements 9 and inputs these to the CPU 1. The CPU 1 detects the ratio of these three primary color constituents and, based upon this ratio, sets the light source color information. This light source color information indicates which of the three primary colors R, G or B is dominant. For example, in the case of an incandescent lamp, the R constituent takes dominance among R, G and B. In the case of a fluorescent lamp, the G constituent is dominant. Therefore, the light source type can be deduced from the light source color information.

The distance measuring circuit 4 detects the photographic subject distance using a distance measuring element (a PSD, for instance) 10 and inputs the detected photographic subject distance to the CPU 1. The light emission circuit 5 illuminates the photographic subject by emitting light with the light emitting tube 11 in response to an instruction from the CPU 1. The shutter control circuit 6 drives a shutter (not shown) with the shutter drive motor 12 in response to an instruction from the CPU 1. The information recording circuit 7 drives the magnetic head 13 in response to an instruction from the CPU 1 to record the information on the magnetic tracks TR which are provided in correspondence with the various photographic frames of the film FI shown in FIG. 1B. In this embodiment, both the light source color information described above and the flash photographing information that indicates that flash photographing has been performed can be recorded as magnetic record information. Either type of information is recorded for every photographic frame. The film feed circuit 14 drives the film feed motor 15 to wind up and wind back the film FI. The sensitivity detection circuit 16 reads the film information from the DX code provided in the film cartridge and inputs it to the CPU 1. The film information referred to here includes the film sensitivity and the number of photographic exposures.

Also connected to the CPU 1 are the first-position switch SW1 which is turned on when the release button (not shown) is pressed halfway down, a release switch SW2 that is turned on when the release button is pressed all the way down and a forced light emission switch SW3, which gives an instruction for performing light emission by the electronic flash device forcedly.

The procedure of the control performed by the CPU 1 is explained in reference to the flow chart in FIG. 2. Note that this processing is executed when the forced light emission switch SW3 is OFF.

In FIG. 2, when it is decided, in step S301 that the first-position switch SW1 is ON, the photometric circuit 2 is operated and its detection output, i.e., the photographic subject brightness, is input in step S302. Then in step S303, the distance measuring circuit 4 is operated and its detection output, i.e., the photographic subject distance, is input. In step S304, a decision is made as to whether or not the input photographic subject brightness is equal to or greater than a specific value, i.e., whether or not the photographic subject has a high degree or a low degree of brightness. If the degree of brightness is high, the light source color detection circuit 3 is operated and the light source color information described above is set based upon its detection output in step S305 and the operation proceeds to step S309.

If, on the other hand, it is decided in step S304 that the brightness of the photographic subject is low, then it is determined in step S306 that flash photographing is to be performed and the operation proceeds to step S307. In step S307, a decision is made as to whether or not electric charging of the main condenser, which stores the electric charge for light emission by the electronic flash device, has been completed. If the electric charging has been completed, the operation proceeds to step S309, and if not, electric charging is performed in step S308 and the operation returns to step S307.

In step S309, the operation waits for the release switch SW2 to be turned on. When the release switch SW2 is turned on, exposure processing is performed in step 310. In other words, focusing of the photographic lens is performed based upon the photographic subject distance and, the aperture value and the shutter speed are determined based upon the photographic subject brightness. Then, based upon the aperture value and the shutter speed, the motor 12 is driven by the shutter control circuit 6 to drive the shutter (not shown) so that it will open/close. And if the brightness of photographic subject is low, light emission is performed by the light emitting tube 11 via the light emission circuit 5 of the electronic flash device in synchronization with the opening of the shutter.

In step S311, a decision is made as to whether or not light emission has been performed by the light emitting tube 11 of the electronic flash device during the exposure processing described above. If light emission has been performed, the operation proceeds to step S312, in which the film feed motor 15 is driven via the film feed circuit 14 to wind up the film FI by one frame. In addition, in synchronization with this winding up, the magnetic head 13 is driven via the information recording circuit 7 to record the flash photographing information on the magnetic track TR of the film FI. If, on the other hand, light emission has not been performed, the film FI is wound up by one frame in step S113, in a similar manner to what has been described above and, at the same time, the light source color information is recorded on the magnetic track TR by the magnetic head 13. Following steps S312 and S313, the processing ends. The light source color information recorded on the film FI is read by the printing device in the print service facility and color correction is performed during printing based upon the information that has been read.

As has been explained, in this embodiment, when normal photographing that is not accompanied by light emission by the electronic flash device has been performed, the light source color information is recorded for the photographic frame. In contrast, when flash photographing accompanied by light emission by the electronic flash device has been performed, recording of the light source color information is prohibited and instead, flash photographing information is recorded. This means that, when printing frames in which flash photographing has been performed, no color correction is performed based upon the light source color information and prints with undesirable colors are prevented. Also, since exposure correction is made based upon the flash photographing information when printing photographic frames on which flash photographing has been performed, photos with even more accurate colors are achieved. Furthermore, since the light source color setting processing, including the operation of the light source color detection circuit 3, is not performed, battery power is not consumed wastefully.

In the embodiment shown in FIG. 2, when light emission by the electronic flash device is to be performed, not only the recording of the light source color information, but the light source color setting processing itself, is prohibited. However, as shown in FIG. 3, it may structured so that the light source color setting processing is performed. FIG. 3 shows a flow chart in which step S305 in FIG. 2 is shifted between steps S302 and S303.

Now, if the photographic subject distance is so great that the illuminating light from the electronic flash device cannot reach the photographic subject during the flash photographing, there is no point in recording the flash photographing information described above. In this case, it is desirable to record the light source color information in place of the flash photographing information. FIG. 4 shows another embodiment which achieves this.

FIG. 4 shows a flow chart which has step S401 inserted between steps S306 and S307 which are explained earlier in reference to FIG. 2. In step S401, a decision is made as to whether or not the photographic subject distance detected in step S303 is less than the flash reach distance. If an affirmative decision is made in step S401, the operation proceeds to step S307. If a negative decision is made, then the operation proceeds to step S305, in which the light source color setting processing is performed. The flash reach distance is a value that is calculated based upon the guide number of the electronic flash device which is stored in the CPU 1 in advance, the aperture value and the film sensitivity input from the sensitivity detection circuit 16.

Figure 5:
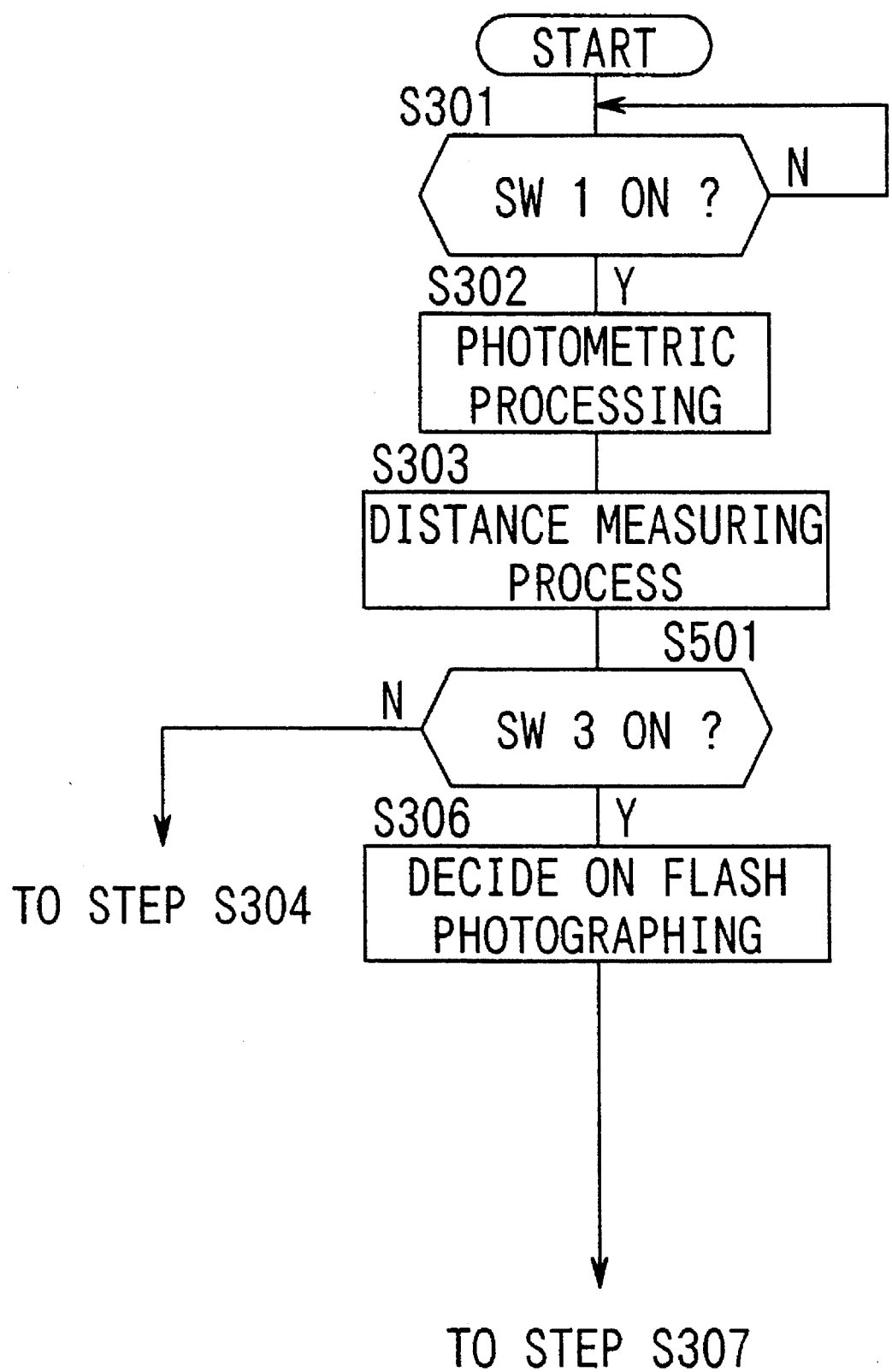
FIG. 5 is a flow chart that explains the operation in yet another embodiment.

FIG. 5 shows another embodiment, to which decision making as to whether or not the forced light emission switch SW3 is ON is added.

In FIG. 5, in step S501 which follows step S303, a decision is made as to whether or not the forced light emission switch SW3 is ON. If a negative decision is made, the operation proceeds to step S304 and if an affirmative decision is made, the operation proceeds to step S306. In short, in the forced light emission mode, light source color setting processing is not performed.

Note that the processing performed in step S307 and subsequent steps is identical to that shown in FIG. 2 and its illustration is, therefore, omitted.

Figure 6:
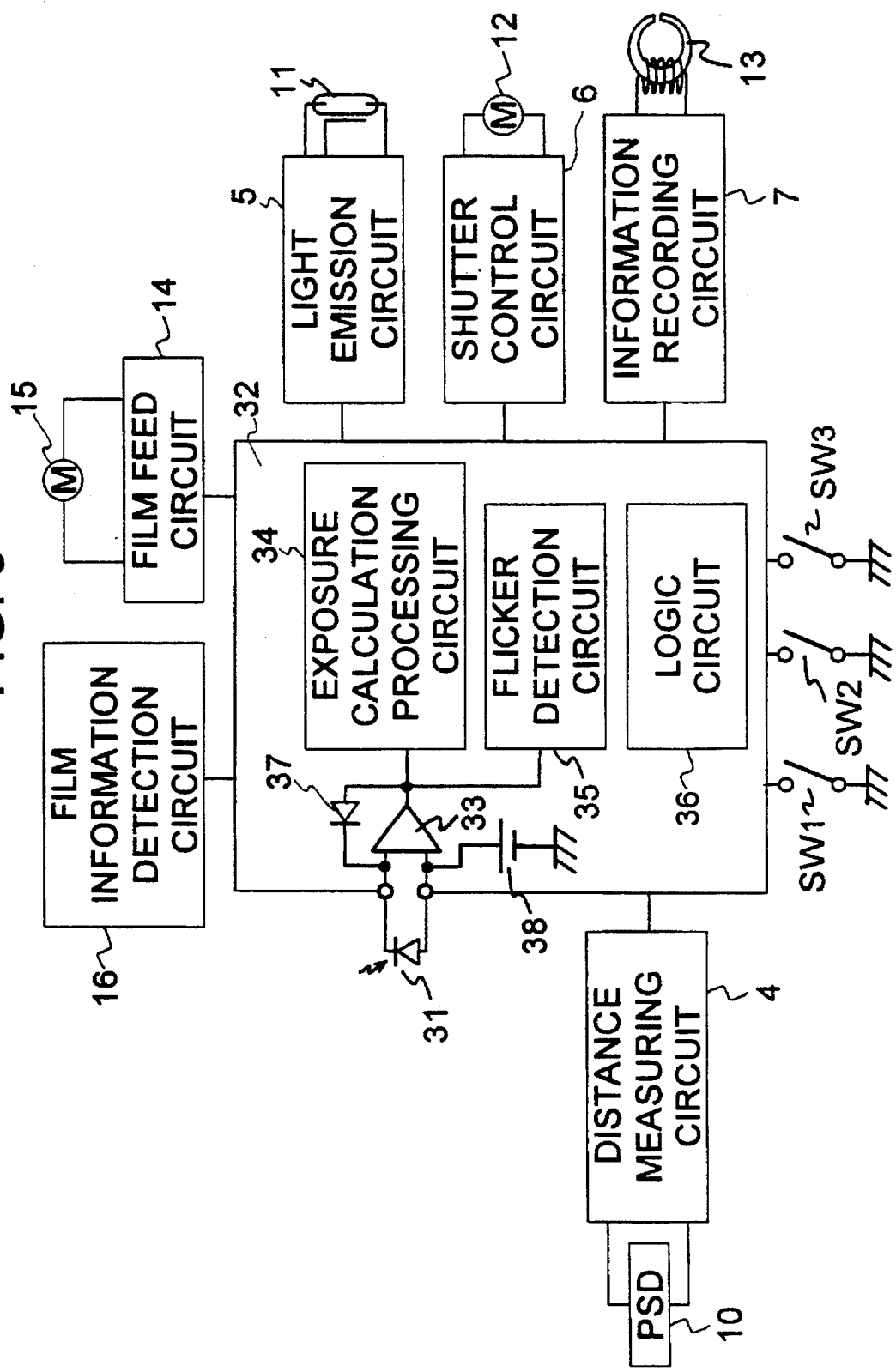
FIG. 6 is a block diagram of the control system in another embodiment, in which light source color identification is performed by detecting flickering of the light source.
Figure 7:
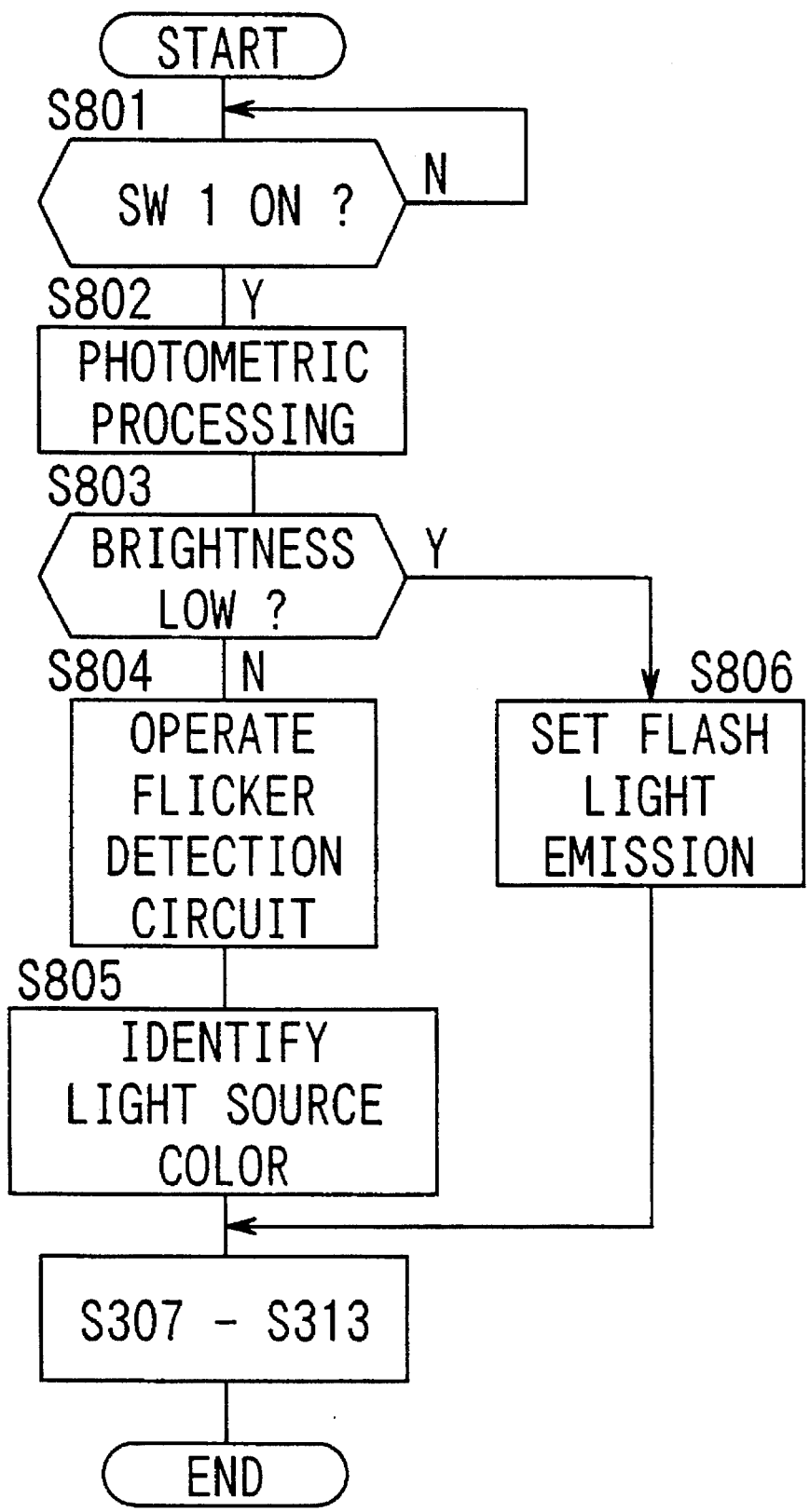
FIG. 7 is a flow chart that explains the operation in the embodiment shown in FIG. 6.

FIGS. 6 and 7 show another embodiment, in which light source color information is obtained by detecting flickering of the light source.

FIG. 6 is a block diagram of the control system in this embodiment. The same reference numbers are assigned to components identical to those in FIG. 1A and here, only the differences are explained.

The photo sensitive element 31 for photometry receives the light from the photographic subject and then performs photoelectric conversion on it. The photoelectric conversion output from the photo sensitive element 31 is input to the head amplifier 33, which is provided inside the CPU 32. An exposure calculation processing circuit 34, which includes an analog processing system for performing exposure calculation and a flicker detection circuit 35 are provided inside the CPU 32 and the output from the head amplifier 33 is input to the exposure calculation processing circuit 34 and the flicker detection circuit 35 as the photometric output. Also provided in the CPU 32 is a logic circuit 36 of the known art that includes a calculation processing circuit for performing various types of calculation. Note that reference number 37 indicates a diode for logarithm compression and that reference number 38 indicates a standard power source.

The exposure calculation processing circuit 34 performs exposure calculation of the known art based upon the photometric output from the head amplifier 33. The flicker detection circuit 34 detects the change in the photometric output over a specific length of time which is determined in advance. Based upon the change, it determines whether or not there is a flicker in the light source which illuminates the photographic subject. In this embodiment, since an analog type amplifier 33, which constitutes the photometric circuit, is internally provided in the CPU, the effect of external noise can be reduced and high accuracy exposure calculation and flicker detection can be performed.

FIG. 7 is a flow chart which shows the details of the processing performed in this embodiment. If it is decided in step S801 that the first-position switch SW1 is ON, the exposure calculation processing circuit 34 performs exposure calculation in step S802, to determine the aperture value and the shutter speed. Then in step S803, a decision is made as to whether or not the photographic subject brightness is equal to or greater than a specific value, i.e., whether the brightness of the photographic subject is high or low. If it is high, the flicker detection circuit 35 is operated in step S804.

In step S805, identification of the light source color is performed based upon the output from the flicker detection circuit 35. It is decided that the light source is a fluorescent light lamp if there is a flicker and that the light source is not fluorescent if there is no flicker. In this embodiment, the information that indicates whether or not the light source is fluorescent is the equivalent to the light source color information. If it is decided in step S803 that the brightness is low, it is determined that flash photographing is to be performed in step S806, without operating the flicker detection circuit 35 or performing light source color identification.

Following steps S805 and S806, processing identical to that performed in steps S307–S313 in FIG. 2 is performed.

Figure 8:
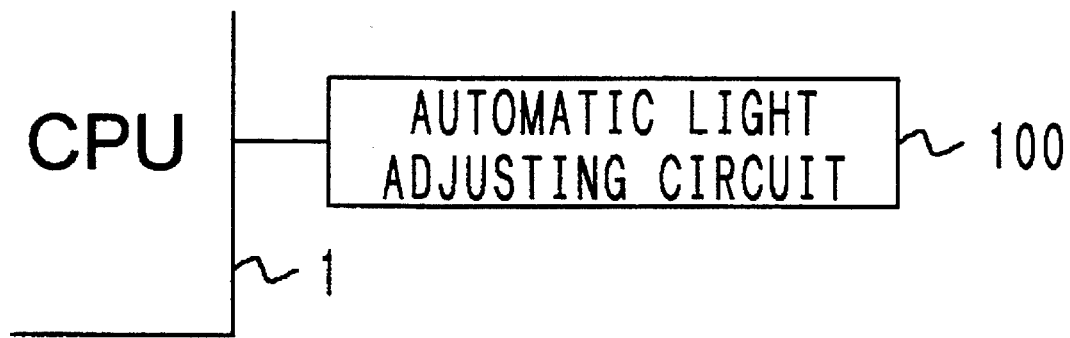
FIG. 8 is a block diagram of the control system of a camera according to another embodiment.

FIG. 8 shows a block diagram of the control system of a camera according to another embodiment of the present invention. An automatic light adjusting circuit 100 is connected to the CPU 1, as well as the circuits and the switches shown in FIG. 1. The light adjusting circuit 100 performs a light adjusting operation by controlling the stop timing of the light emission of the flash device as is known. However, if the photographic subject distance is so long, since the time required to light emission becomes longer than the synchronization shutter speed, the light adjusting operation is not performed normally. The CPU 1 is able to detect whether or not the light adjusting operation of the light adjusting device 100 is performed normally.

Figure 9:
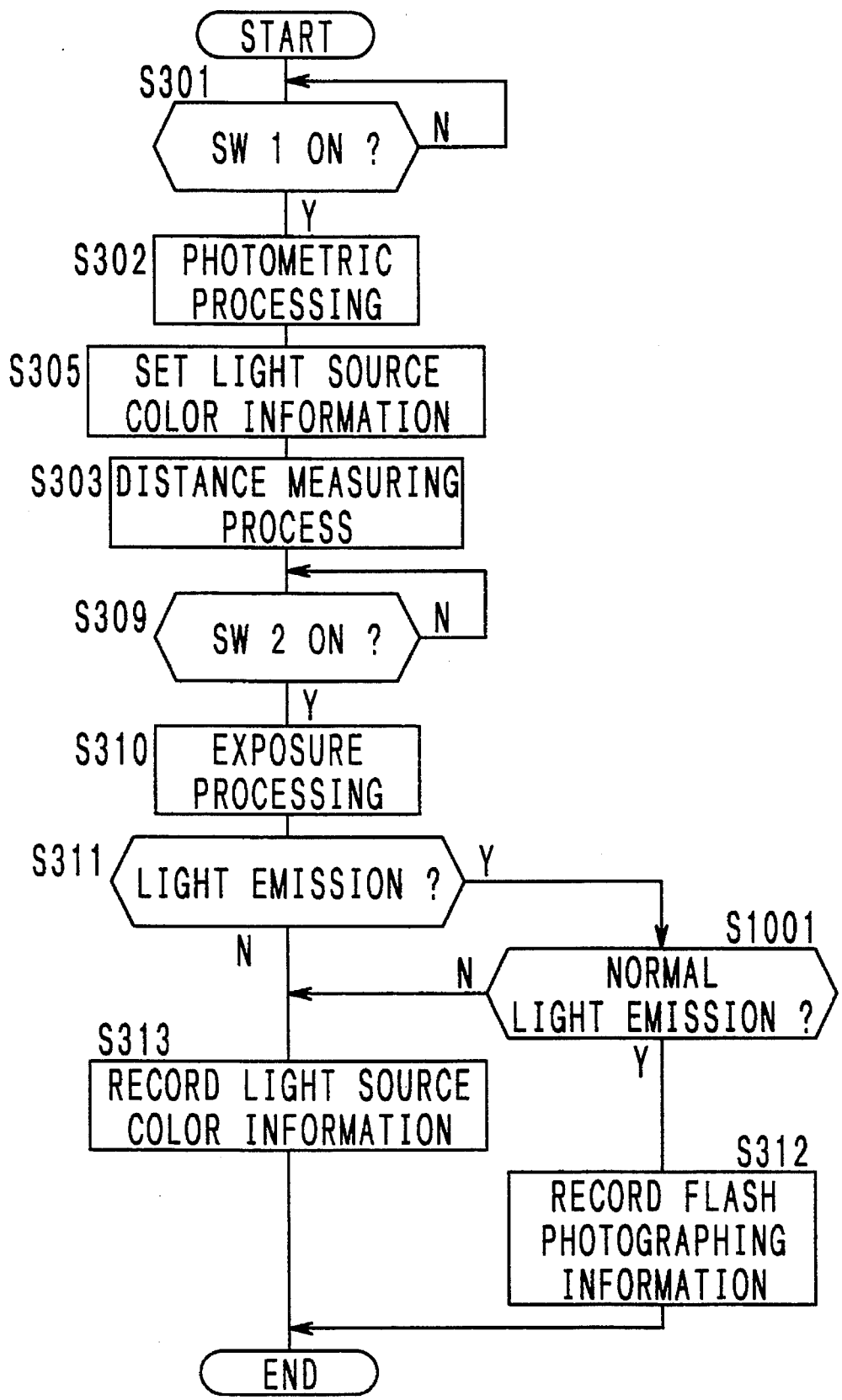
FIG. 9 is a flow chart that explains the operation of the CPU shown in FIG. 8.

FIG. 9 shows the procedure of control of this embodiments. After the processing of steps S301–S304, S309 and S310, the operation proceeds to step S311. If it is decided in step S311 that the light emission by the flash device is not performed, the light source color information is recorded in step S313. If, on the other hand, it is decided that the light emission by the flash device is performed, the operation proceeds to step S1001, in which a decision is made as to whether or not the light adjustment by the light adjusting circuit 100 is performed normally. If an affirmative decision is made in step S1001, the light source color information is recorded in step S312. If a negative decision is made in step S1001, the operation proceeds to step S313 to record the light source color information. In this case, light from the flash device hardly illuminates the photographic subject since the photographic subject distance is so long. Accordingly, the light source color information is recorded instead of the flash photographing information.

Figure 10:
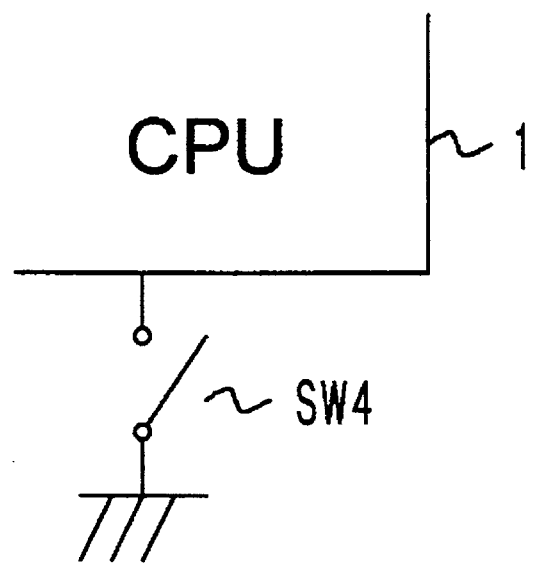
FIG. 10 is a block diagram of the control system of a camera according to another embodiment.
Figure 11:
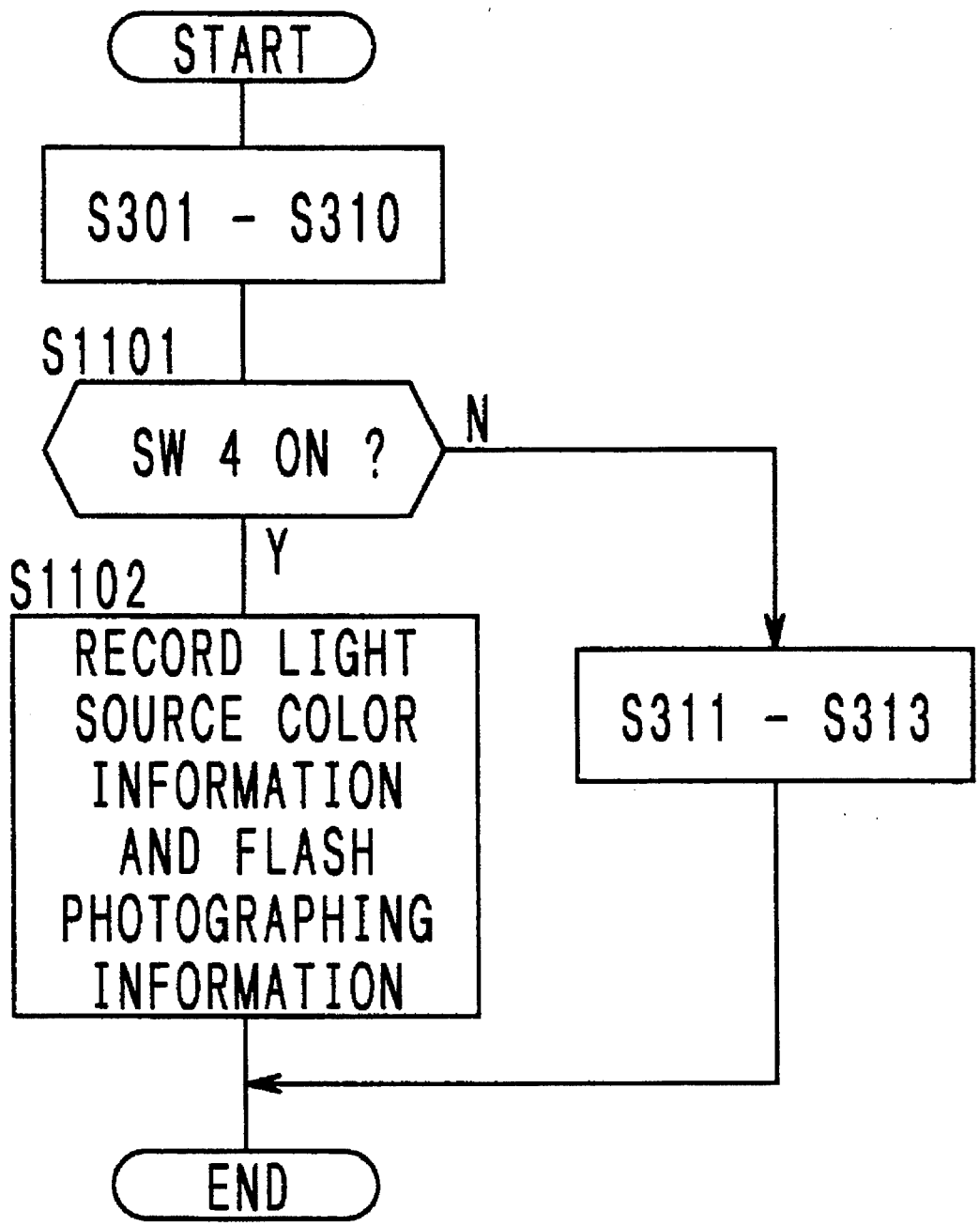
FIG. 11 is a flow chart that explains the operation of the CPU shown in FIG. 10.

FIG. 10 shows a block diagram of the control system of a camera according to another embodiment. A mode selecting switch SW4 which is manually operated by the operator is connected to the CPU 1, as well as the circuits and the switches shown in FIG. 1. When the mode selecting switch SW4 is ON, CPU 1 sets a specific mode. The procedure of control including ON/OFF decision of the mode selecting switch SW4 is shown in FIG. 11. After the processing in steps S301–S310 has been executed, a decision is made in step S1011 as to whether or not the mode selecting switch SW4 is ON. If the switch SW4 is OFF, the processing in steps S311–S313 shown in FIG. 2 is executed. If it is ON, i.e., if the specific mode described above has been set, both the light source color information and the flash photographing information are recorded in step S1012.

As has been explained, in this embodiment, when the mode selecting switch SW4 is ON, both the light source color information and the flash photographing information are recorded for the photographic frame, whether or not the light emission by the flash device has been performed. Accordingly, appropriate information among above two information can be used in printing, therefore the possibility that pictures with appropriate color can be obtained.

Note that, although examples in which light source color information or flash photographing information is magnetically recorded have been explained so far, there is no particular restriction as to the method of recording and, for example, it may be performed optically or electrically. Also, in the examples described above, information is recorded on film. However, alternatively, a recording area may be provided in the film cartridge and the information may be recorded there. Furthermore, a method of light source color detection is not restricted to that in the embodiments either. In addition, the explanation has been made of a camera that is provided with the light source color information recording apparatus but the present invention can be applied to a system that does not have a photographing function and which only records information.

We claim:

1. A light source color information recording apparatus comprising;

a recording control device that records light source color information related to a color of light illuminating a photographic subject detected by a light source color information detection device, in a specific information recording medium for each photographic frame, and a prohibiting device that prohibits recording of said light source color information performed by said recording control device, for photographic frames on which photographing using a flash device, has been performed.

2. A light source color information recording apparatus according to claim 1, wherein;

said information recording medium is a photographic film.

3. A light source color information recording apparatus according to claim 2, wherein;

said recording control device includes a feed device which feeds said film, a magnetic head, and a magnetic head control device which controls said magnetic head to record said light source color information in magnetic recording areas that are provided on said film corresponding to photographic frames of said film when said film is fed by said feed device.

4. A camera capable of recording light source color information comprising;

a photographing device which performs photographing, a light source color information detection device that detects light source color information related to a color of light illuminating a photographic subject, a recording control device that records said light source color information detected by said light source color information detection device, in a specific information recording medium for each photographic frame on which photographing is performed by said photographing device, and a prohibiting device that prohibits a recording of said light source color information performed by said recording control device, for photographic frames on which photographing using a flash device, has been performed.

5. A camera according to claim 4 wherein;

said light source color information detection device includes:

a photo sensitive element that receives a light from said photographic subject to perform photoelectric conversion, a constituent detection device that detects each of R, G and B constituents of said light from said photographic0 subject based upon a photoelectric conversion output from said photo sensitive element, and an information setting device that sets said light source color information based upon a ratio of said R, G and B constituents which have been detected.

6. A camera according to claim 4 wherein;

said light source color information detection device includes:

a photo sensitive element that receives a light from said photographic subject to perform photoelectric conversion, a flicker detection device that detects whether or not a flicker is present in said light from said photographic subject based upon an output from said photo sensitive element over a specific period of time, and an information setting device that sets presence or absence of flicker as said light source color information.

7. A camera according to claim 4 further comprising;

a decision-making device that, prior to photographing on each photographic frame, decides whether or not said photographing using said flash device is to be performed, wherein;

said prohibiting device also prohibits an operation of said light source color information detection device if said decision-making device decides that said photographing using said flash device is to be performed.

8. A camera according to claim 7, further comprising;

a photometric device that detects photographic subject brightness, wherein;

said decision-making device decides whether or not said photographing using said flash device is to be performed based upon whether or not said photographing subject brightness is equal to or greater than a specific value.

9. A camera according to claim 7, further comprising;

a forced light emission switch that is operated to forcibly cause light emission of said flash device wherein;

said decision-making device decides whether or not said photographing using said flash device is to be performed based upon whether or not said forced light emission switch has been operated.

10. A camera according to claim 4, further comprising;

a distance detection device that detects photographic subject distance, wherein;

said prohibiting device allows recording of said light source color information by said recording control device when said photographic subject distance detected by said distance detection device is equal to or greater than a specific value even if said photographing using said flash device has been performed.

11. A camera according to claim 10 wherein;

said specific value set for said photographic subject distance is a flash reach distance that is equivalent to a maximum distance over which an illuminating light from said flash device can reach.

12. A camera according to claim 11 wherein;

said flash reach distance is calculated based upon a guide number of said flash device, an aperture value and a film sensitivity.

13. A camera according to claim 4 further comprising;

a flash decision device which decides whether or not said light emission by said flash device is performed normally, wherein;

said prohibiting device prohibits said recording of said light source color information when said flash decision device decides that said light emission by said flash device has been performed normally, for said photographic frames on which said photographing using said flash device has been performed.

14. A camera according to claim 13 further comprising;

a light adjustment device that performs a light adjustment by controling a stop timing of said light emission by said flash device, wherein;

said flash decision device is a light adjusting decision device that decides whether or not said light adjustment by said light adjustment device has been performed normally.

15. A light source color information recording apparatus comprising;

a recording device that records any one of light source color information related to a color of light illuminating a photographic subject, which is detected by a light source color information detection device, and flash photographing information that indicates that photographing using a flash device has been performed, in a specific information recording medium for each photographic frame, and a recording control device that controls said recording device in such a manner that said light source color information is recorded in said information recording medium for photographic frames on which photographing has been performed without using said flash device and said flash photographing information is recorded for photographic frames on which said photographing using said flash device has been performed.

16. A camera capable of recording light source color information comprising;

a photographing device which performs photographing, a light source color information detection device that detects light source color information related to a color of light illuminating a photographic subject, a recording device that records any one of said light source color information detected by said light source color information detection device, and flash photographing information that indicates that photographing using a flash device has been performed, in a specific information recording medium for each photographic frame, and a recording control device that controls said recording device in such a manner that said light source color information is recorded in said information recording medium for photographic frames on which photographing has been performed without using said flash device and said flash photographing information is recorded for photographic frames on which said photographing using said flash device has been performed.

17. A camera according to claim 16 further comprising;

a decision-making device that, prior to photographing on each photographic frame, decides whether or not said photographing using said flash device is to be performed, and a prohibiting device which prohibits an operation of said light source color information detection device if said decision-making device decides that said photographing using said flash device is to be performed.

18. A camera according to claim 17 further comprising;

a photometric device that detects photographic subject brightness wherein;

said decision-making device decides whether or not said photographing using said flash device is to be performed based upon whether or not said photographing subject brightness is equal to or greater than a specific value.

19. A camera according to claim 16 further comprising;

a distance detection device that detects photographic subject distance wherein;

said recording control device controls said recording device to record said light source color information when said photographic subject distance detected by said distance detection device is equal to or greater than a specific value even if said photographing using said flash device has been performed.

20. A camera according to claim 19 wherein;

said specific value set for said photographic subject distance is a flash reach distance that is equivalent to a maximum distance over which an illuminating light from said flash device can reach.

21. A camera according to claim 20 wherein;

said flash reach distance is calculated based upon a guide number of said flash device, an aperture value and a film sensitivity.

22. A camera according to claim 16 further comprising;

a mode setting device that sets a specific mode in which both said light source color information and said flash photographing information are recorded, wherein;

when said specific mode is set, said recording control device controls said recording device in such a manner that both said light source color information and said flash photographing information are recorded for each photographic frame, whether or not said flash device has been used for photographing.

* * * * *